United States Patent
Baker et al.

(10) Patent No.: US 8,049,731 B2
(45) Date of Patent: Nov. 1, 2011

(54) SYSTEM AND METHOD FOR IMPLEMENTING A CONTROL FUNCTION VIA A SENSOR HAVING A TOUCH SENSITIVE CONTROL INPUT SURFACE

(75) Inventors: Jeffrey R. Baker, Thousan Oaks, CA (US); Michael J. Errico, Thousan Oaks, CA (US); David J. Arthur, Ventura, CA (US); Steve B. Branton, Ventura, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 965 days.

(21) Appl. No.: 11/488,954

(22) Filed: Jul. 19, 2006

(65) Prior Publication Data

US 2007/0024595 A1 Feb. 1, 2007

Related U.S. Application Data (60) Provisional application No. 60/703,568, filed on Jul. 29, 2005.

(51) Int. Cl.
*G06F 3/41* (2006.01)
(52) U.S. Cl. .................................. 345/173; 345/178
(58) Field of Classification Search .................. 345/684, 345/685, 588, 688, 156–158, 163, 168, 171–179, 345/660; 455/556.1, 566; 382/115, 119, 382/124; 358/1.12, 473; 347/2; 235/435; 381/121, 124; 178/18.01–18.03, 19.05, 771
See application file for complete search history.

(56) References Cited

U.S. PATENT DOCUMENTS

| | | | |
|---|---|---|---|
| 4,963,702 A | | 10/1990 | Yaniger et al. |
| 5,376,947 A | | 12/1994 | Kuroda |
| 5,479,530 A | * | 12/1995 | Nair et al. ..................... 382/119 |
| 5,673,066 A | | 9/1997 | Toda et al. |
| 5,767,457 A | * | 6/1998 | Gerpheide et al. ......... 178/18.03 |
| 5,821,930 A | * | 10/1998 | Hansen ......................... 715/702 |
| 5,943,044 A | * | 8/1999 | Martinelli et al. ............ 345/174 |
| 6,124,845 A | | 9/2000 | Toda et al. |
| 6,239,790 B1 | * | 5/2001 | Martinelli et al. ............ 345/174 |
| 6,822,635 B2 | | 11/2004 | Shahoian et al. |
| 7,280,679 B2 | * | 10/2007 | Russo ............................ 382/124 |
| 7,474,772 B2 | * | 1/2009 | Russo et al. ................... 382/124 |
| 2002/0015064 A1 | * | 2/2002 | Robotham et al. ............ 345/863 |
| 2003/0142855 A1 | * | 7/2003 | Kuo et al. ..................... 382/119 |
| 2004/0012572 A1 | * | 1/2004 | Sowden et al. ............... 345/173 |
| 2004/0056895 A1 | * | 3/2004 | Hedrick ........................ 345/764 |
| 2004/0090429 A1 | * | 5/2004 | Geaghan et al. .............. 345/173 |
| 2004/0150630 A1 | * | 8/2004 | Hinckley et al. .............. 345/173 |
| 2004/0194140 A1 | * | 9/2004 | Rao et al. ......................... 725/52 |
| 2005/0012714 A1 | * | 1/2005 | Russo et al. ................... 345/157 |
| 2005/0057531 A1 | * | 3/2005 | Patino et al. .................. 345/174 |
| 2005/0226504 A1 | * | 10/2005 | Kondo et al. ................. 382/173 |
| 2005/0251760 A1 | * | 11/2005 | Sato et al. ..................... 715/856 |
| 2005/0275632 A1 | * | 12/2005 | Pu et al. ........................ 345/171 |
| 2005/0280636 A1 | * | 12/2005 | Hildebrandt et al. ......... 345/173 |
| 2006/0078174 A1 | * | 4/2006 | Russo ............................ 382/121 |
| 2006/0109252 A1 | * | 5/2006 | Kolmykov-Zotov et al. . 345/173 |

(Continued)

*Primary Examiner* — Prabodh M Dharia
(74) *Attorney, Agent, or Firm* — Brooks Kushman P.C.

(57) ABSTRACT

A method for implementing a control function via a sensor having a touch sensitive control input surface. The method includes detecting a contact with the touch sensitive control input surface, determining a pressure value corresponding to the contact, and initiating a control function from a set of possible control functions based at least in part on the pressure value.

19 Claims, 2 Drawing Sheets

U.S. PATENT DOCUMENTS

| | | | |
|---|---|---|---|
| 2006/0181521 A1* | 8/2006 | Perreault et al. | 345/173 |
| 2006/0238495 A1* | 10/2006 | Davis | 345/156 |
| 2006/0277107 A1* | 12/2006 | Beal et al. | 705/14 |
| 2006/0278444 A1* | 12/2006 | Binstead | 178/18.06 |
| 2007/0180394 A1* | 8/2007 | Hedrick | 715/771 |
| 2007/0273491 A1* | 11/2007 | Recknagel et al. | 340/436 |
| 2007/0274575 A1* | 11/2007 | Russo | 382/124 |
| 2009/0148005 A1* | 6/2009 | Rowe | 382/115 |
| 2010/0081471 A1* | 4/2010 | Silverbrook | 455/556.1 |
| 2010/0275132 A1* | 10/2010 | Hildebrandt et al. | 715/752 |

* cited by examiner

SYSTEM AND METHOD FOR IMPLEMENTING A CONTROL FUNCTION VIA A SENSOR HAVING A TOUCH SENSITIVE CONTROL INPUT SURFACE

CROSS-REFERENCE TO RELATED APPLICATIONS

This application claims the benefit of U.S. provisional application Ser. No. 60/703,568 filed Jul. 29, 2005.

BACKGROUND OF THE INVENTION

1. Field of the Invention

The present invention relates generally to a sensor and, in particular, to a system and method for implementing a control function via a sensor having a touch sensitive control input surface.

2. Background Art

In general, a scroll sensor is a sensor designed to convert the touch of an operator (i.e., user) into an input for an electronic device. Typically, scroll sensors are planar devices having the shape of a strip or a ring and may be implemented on the front face of a corresponding electronic device. Conventional scroll sensors are generally activated by touching and/or sliding an operator digit (e.g., finger) or an implement (e.g., stylus) on the surface of the sensor. The scrolling action may be linear, rotational, or along a more complex path.

Electronic devices that benefit from the utility of scroll sensors include, for example, cell phones, personal media players, portable gaming devices, computers, and cameras. Typically, the corresponding device has a display with a graphical user interface that may give feedback during scrolling actions. For example, the act of changing the volume on a music player might be indicated on a display by a moving bar whose length is proportional to volume.

An example of a portable electronic device with a single linear scroll sensor is the iRiver H10 mp3 player. Touching the sensor and moving or, in the alternative, touching the sensor at one end and holding accomplishes various actions such as song selection, volume control, etc.

An example of a portable electronic device with a rotary scroll sensor is the apple iPod. Touching the sensor and scrolling accomplishes various actions such as changing volume. The size of the change is generally proportional to the angular travel of the touch.

Conventional sensors implemented in connection with such electronic devices are not pressure sensitive. The present invention may add to the utility of sensors, such as the scroll sensor described above, by utilizing the added dimension of pressure.

A method of constructing a pressure sensitive resistive linear scroll sensor is described in U.S. Pat. No. 4,963,702 (assigned to Interlink Electronics Inc. and incorporated by reference in its entirety) which shows two orthogonal sensors layered to form a two dimensional touch pad.

A method of making a ring-shaped scroll sensor is described in U.S. provisional application No. 60/572,155 filed May 18, 2004 (incorporated by reference in its entirety), U.S. patent application Ser. No. 11/129,805 filed May 16, 2005 (incorporated by reference in its entirety), now U.S. Pat. No. 7,310,089.

SUMMARY OF THE INVENTION

According to an embodiment of the present invention, a method is provided for implementing a control function via a sensor having a touch sensitive control input surface. The method comprises detecting a contact with the touch sensitive control input surface, determining a pressure value corresponding to the contact, initiating a first control function in response to the pressure value being within a first predetermined range, and initiating a second control function in response to the pressure value being within a second predetermined range.

According to another embodiment of the present invention, a method is provided for implementing a control function via a sensor having a touch sensitive control input surface. The method comprises dividing the touch sensitive control input surface into a plurality of regions, wherein one or more of the plurality of regions are pressure sensitive regions, and assigning each of the plurality of regions to at least one control function, wherein each of the pressure sensitive regions are assigned two or more control functions. The method further comprises determining when an operator initiates contact with a first pressure sensitive region, determining a pressure value corresponding to the operator initiated contact, initiating a first control function in response to the pressure value being within a first predetermined range, and initiating a second control function in response to the pressure value being within a second predetermined range.

According to yet another embodiment of the present invention, a method is provided for implementing a control function via a sensor having a touch sensitive control input surface. The method comprises detecting a contact with the touch sensitive control input surface, determining a pressure value corresponding to the contact, and initiating a control function from a set of possible control functions based at least in part on the pressure value.

DETAILED DESCRIPTION

Portable electronic devices, such as personal digital assistants, portable telephones, remote controls, and the like, are trending toward increasing functionality without increasing physical size. At the same time, this increased functionality is accompanied by a need for increased input from and interaction with the user. There is, therefore, a demand for input devices (i.e., sensors), such as mouse pointing sensors, scroll rings, and scroll strips which can be used in handheld (i.e., portable) devices.

Scroll sensors are generally useful for selecting among items in a list. Furthermore, a scroll sensor may be implemented for changing a parameter continuously or discretely within a corresponding range of possibility. The amount of change generally corresponds to the location (i.e., position relative to a surface of the scroll sensor) of touch and/or the length of a swipe. The rate of parameter change may be either constant or proportional to the speed of a swipe. Continued contact at the end of a swipe may induce further parameter change at a predetermined (e.g., constant) rate.

As recognized in the present application, user interface efficiency and utility may be improved if the speed (i.e., rate) of parameter change is implemented as a function of (e.g., proportional to) the pressure or force of touch. For example, rather than scrolling through a list of ten thousand songs at a rate of one song per second, the scrolling speed may be proportional to force. Light touches may be defined to cause scrolling at one song per second, while very heavy touches could be defined to traverse the entire list in one second.

Accordingly, the present invention is generally a method for interfacing a pressure sensitive sensor, such as a scroll sensor, with an electronic device (e.g., a portable device). In at least one embodiment, the present invention may be implemented in connection with a portable electronic device having the functionality of a music player, a video player, a photo organizer, a data storage device, a personal computer, a personal digital assistant (i.e., PDA), and/or the like. In at least one other embodiment, the portable electronic device may be implemented in connection with a remote control for a system having one or more afore mentioned functionality. Furthermore, the portable device may have its own display and/or utilize a remote display. However, the present invention may be implemented in connection with any appropriate device and/or system to meet the design criteria of a particular application.

In general, a pressure sensitive scroll sensor may be implemented in connection with a portable device (e.g., portable electronic device). In at least one embodiment, the sensor may be of the type described in detail below. However, the scroll sensor may have any appropriate configuration and may implement any appropriate pressure sensing (i.e., pressure determining, pressure measuring, pressure identifying, etc.) technology to meet the design criteria of a particular application.

In at least one embodiment, the portable electronic device may have a graphical user interface (i.e., GUI) for displaying items that may be selected. These items may be top-level menu items, such as actions or functionality sets (e.g., play music, watch video, browse pictures, system settings, and the like), or lower level menu items, such as specific media files (e.g., songs, videos, and the like). A particular item may be identified for selection (i.e., indicated) by highlighting the particular item with a cursor, underlining, reverse video, and/ or some other form of selection indication. Furthermore, one or more embodiments of the present invention may include a GUI configured to display only a single item, as opposed to a list of items with a highlighted element. In such an embodiment, the displayed single item may correspond to an element identified for selection.

In addition, the portable electronic device may have an entry mechanism (i.e., selection mechanism) for entry (i.e., selection) of the identified (e.g., highlighted) item. In at least one embodiment, the entry mechanism may be a separate button on the device. In at least one other embodiment, the entry mechanism may be a switch integrated with the scroll sensor, such as metal snap dome under the sensor and/or the like. In yet at least one other embodiment, the entry mechanism may be associated with tapping the scroll sensor (e.g. on a laptop personal computer touchpad). However, any appropriate entry mechanism may be implemented to meet the design criteria of a particular application.

Figure 1:
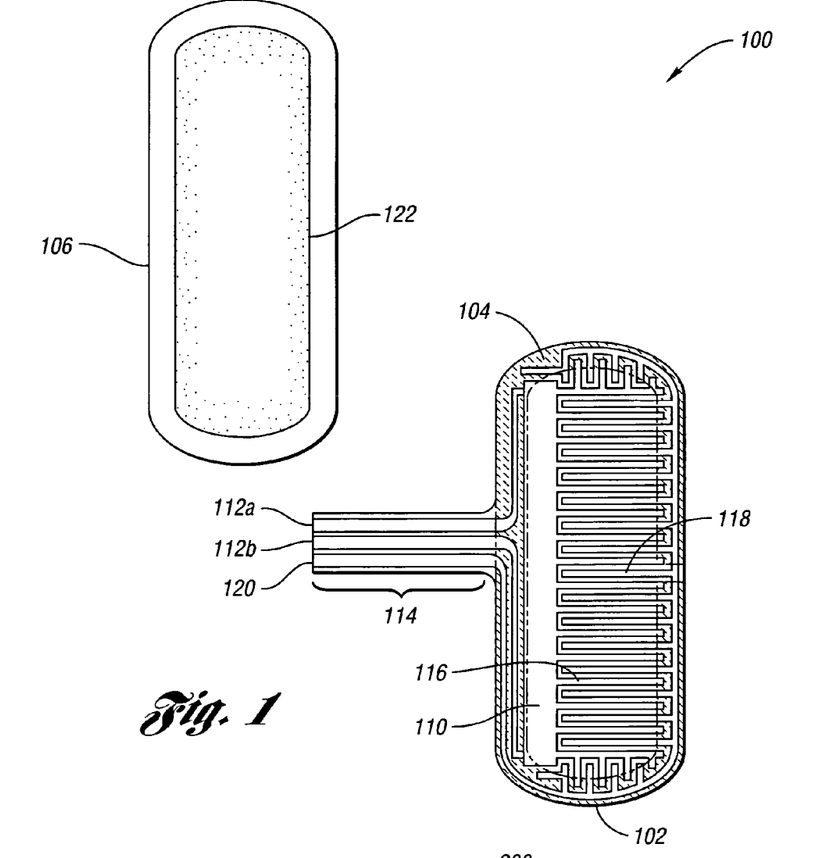
FIG. 1 is a schematic diagram of a pressure sensitive scroll sensor according to at least one embodiment of the present invention.

Referring, now, to FIG. 1, a schematic diagram is provided of a pressure sensitive scroll sensor (i.e., scroll sensor) 100 according to at least one embodiment of the present invention. While a single linear strip sensor (i.e., a linear scroll strip) is shown in FIG. 1, it should be understood that the present invention may be implemented in connection with any appropriate sensor and/or quantity of sensors to meet the design criteria of a particular application.

As shown in FIG. 1, then, the scroll sensor 100 may comprise a bottom substrate 102, a spacer 104 such as an adhesive spacer, and/or a top substrate 106. In general, the bottom substrate 102 may comprise any appropriate material to meet the design criteria of a particular application, such as a polymer (e.g., PET), a rigid circuit board, a flexible circuit board, and/or the like. The bottom substrate 102 may include a fixed resistor 110 which, in at least one embodiment, may be screen printed on the bottom substrate 102 using a carbon polymer thick film. The resistor 110 may be printed such that the resistance per unit length is substantially constant along a length of the resistor 110.

In at least one embodiment, conductive drive traces 112 (e.g., 112a and 112b) may be implemented (e.g., printed) such that the conductive drive traces (i.e., drive lines) 112 contact (i.e., intersect, are in electronic communication with) one or more ends of the resistor 110. The drive traces 112 may optionally extend out into a tail region 114 of the bottom substrate 102. During operation of the scroll sensor, an electric potential may be applied across at least a portion of the fixed resistor 110 via the drive traces 112.

A first set of conductive traces 116, such as fixed-potential conductive traces, may extend from the fixed resistor 110 and cross a width of the bottom substrate 102. When a drive voltage is placed across the drive lines 112, each member of the first set of conductive traces 116 is generally at an electric potential corresponding to the drive voltage and the position of the member.

A second set of conductive traces 118 may be interleaved with the first set of conductive traces 116. Each member of the second set 118 may be connected in common with (i.e., may be in electronic communication with) each other member and with a sense trace 120 (i.e., sense line) that may extend out to the tip of the tail 114. In the untouched state of the sensor 100, the two sets of conductive traces (i.e., 116 and 118) are generally not in electrical contact.

In at least one embodiment, one or more of the traces (e.g., 112, 116, 118, 120, etc.) may be printed using the same carbon ink as the fixed resistor 110. In at least one other embodiment, one or more of the traces may be printed of more highly conductive silver or nickel/silver based polymer thick film ink. However, each of the traces may be printed using any appropriate substance and/or technique to meet the design criteria of a particular application.

The spacer 104 may be any appropriate substance capable of implementing a gap between the top 106 and bottom 102 substrates. In at least one embodiment, the spacer 104 may include an adhesive applied around a perimeter of the sensor 100 for spacing the top 106 and bottom 102 substrates apart and holding elements of the sensor 100 together. Furthermore, the spacer 104 may have any appropriate thickness to meet the design criteria of a particular application, such as a thickness between 0.002" and 0.013". In one or more embodiments, the spacer 104 may be screen printed using a pressure sensitive adhesive, cut from a film pressure sensitive adhesive, built up using any combination of materials that can separate and/or adhere the top 106 and bottom 102 substrates, and/or the like.

In general, the top substrate 106 may be a flexible polymer sheet, such as PET, polyimide, and/or any other film material. Alternatively, the top substrate 106 may be a less flexible material, such as polycarbonate, thin metal and/or very thin circuit board material. However, the top substrate 106 may include any appropriate material that is sufficiently deformable such that a force applied to the top substrate 106 results in the top substrate 106 contacting the bottom substrate 102. In general, the sensor is activated when the top substrate 106 is brought into contact with the bottom substrate 102.

Optionally, a wear layer may be applied to a top surface of the top substrate 106 for protecting and/or decorating the top surface. In an embodiment having a transparent wear layer, a graphic may be applied to an inside surface (i.e., the surface between the wear layer and the top substrate 106) of the wear layer. In at least one other embodiment, the sensor 100 may be covered with an actuator layer, such as a metallized silicone keypad membrane typical in a cell phone.

An inside (i.e., bottom) surface 122 of the top substrate 106 may be coated with any appropriate conductive or partially conductive substance, such as FSR™ ink which is disclosed in U.S. Pat. Nos. 5,296,837 (incorporated by reference in its entirety) and 5,302,936 (incorporated by reference in its entirety) which are assigned to Interlink Electronics, Inc. When the top 106 and bottom 102 substrates are pressed together, the coating on the bottom surface 122 of the top substrate 106 may electrically connect the first 116 and second 118 sets of conductive traces at a resistance that is generally proportional to applied force.

The strip sensor 100 may be linear in the sense that the resistance per unit length along the fixed resistor 110 may be substantially constant. However, it should be understood that the sensor 100 may be implemented as any suitable geometric shape to meet the design criteria of a particular application, such as a circle, an arc, a triangle, a square, etc. That is, it should be understood that the sensor 100 need not be geometrically straight. It could, for example, be an arc, a serpentine path, end to end attached linear segments, etc.

In at least one embodiment, the bottom substrate 102 of the scroll sensor 100 may be a flexible material such as polyester, polyimide, and/or the like. In the case of polyester or other relatively low temperature flexible polymer film, the first 116 and second 118 sets of conductive traces may be screen printed from silver polymer thick film ink and/or other appropriate material. In the case of polyimide, a flexible polymer generally used in the flexible circuit industry, the first 116 and second 118 sets of conductive traces could be etched out of a very thin copper layer bonded to the substrate 102. Alternately, the bottom substrate 102 could be built out of phenolic, FR4, and/or other traditional rigid circuit board material. In such a case, the first 116 and second 118 sets of conductive traces could be etched from the copper layer bonded to that board. Copper conductive traces may optionally be tinned or gold plated such as to prevent oxidation.

In an embodiment having a rigid board substrate, the rigid board may have plated through holes at its edges that have been sliced in half in order to form castellations. The castellations are generally points that may be soldered to a host circuit board.

In at least one other embodiment, the first 116 and second 118 sets of conductive traces may be formed directly on the same circuit board that includes the utilization circuit (i.e., a circuit that receives a signal from the sensor 100). When the components of the bottom substrate 102 are assembled in a high temperature solder reflow process and the spacer 104 and/or top substrate 106 are formed of materials that cannot withstand high temperature, the spacer 104 and/or top substrate 106 may be adhered directly to the bottom substrate 102 after the high temperature solder reflow process. By contrast, if the spacer 104 and/or top substrate 106 are formed of high temperature materials, such as polyimide, then the spacer 104 and/or top substrate 106 may be adhered to the bottom substrate 102 before the application of any solder reflow process. In such an embodiment, the spacer 104 and/or top substrate 106 may be subjected to solder reflow with the other components of the bottom substrate 102.

Whether built on a rigid or flexible substrate, several methods are available for connecting the sensor 100 to a utilization circuit. For example, in at least one embodiment a flexible tail, such as the tail 114, may be provided on the sensor 100 for inserting into a connector on the utilization circuit. In at least one other embodiment, the sensor 100 may include edge castellations (i.e., points) for soldering the sensor directly to a utilization circuit board. However, any appropriate method and/or apparatus may be implemented for connecting the sensor 100 to a utilization circuit.

Figure 2:
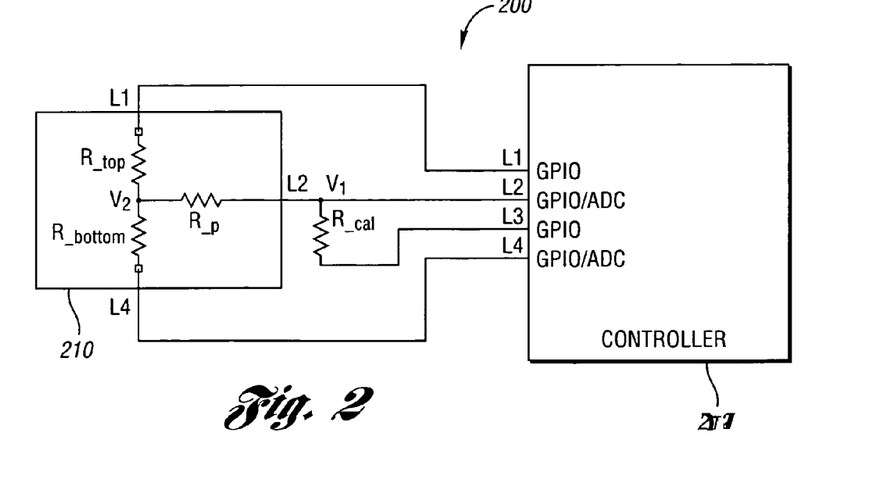
FIG. 2 is a schematic diagram of a system having a pressure sensitive sensor represented as an electronic circuit in accordance with an embodiment of the present invention.

Referring to FIG. 2, a schematic diagram is provided of a system 200 having a pressure sensitive sensor (e.g., the sensor 100) represented as an electronic circuit in accordance with an embodiment of the present invention. In general, the box 210 comprising the three resistors R_top, R_bottom, and R_p represents the sensor. R_top and R_bottom generally represent the resistances of the fixed resistor 110 that are above and below a touch point, respectively. R_p represents a resistance between the first 116 and second 118 sets of conductive traces through a conductive path provided when the bottom surface 122 of the top substrate 106 is brought into contact with the first 116 and second 118 sets of conductive traces of the bottom substrate 102.

In accordance with at least one embodiment of the present invention, a controller (e.g., microcontroller, host microprocessor, and/or the like) 212 may be implemented in connection with the sensor 210. In the embodiment illustrated in FIG. 2, four lines, such as four general purpose input-output (i.e., GPIO) lines L1-L4, may be implemented in connection with the sensor 210. One or more of the lines, such as L2 and L4, may also be configured as analog-to-digital converters (i.e., ADCs). In general, each of the lines L1-L4 may be configured as high-impedance inputs or outputs that may, in turn, be driven either high or low. Another resistor, R_cal, may be connected (i.e., electronically coupled) between a sense line (e.g., sense trace 120) and a line, such as L3. In at least one embodiment, R_cal may be an external resistor.

During position measurement, a potential (i.e., voltage potential) may be placed across the ends of the fixed resistor 110 by, for example, driving line 1 (i.e., L1) high and line 4 (i.e., L4) low. However, any appropriate technique may be implemented to place a potential across a segment of the fixed resistor 110 to meet the design criteria of a particular application. In general, a voltage drop is experienced across the length of the resistor 110 such that a voltage at any spot (e.g., a touch point) along the resistor 110 generally corresponds to (i.e., is generally proportional to) a distance from the spot to an end of the resistor 110. When the first 116 and second 118 sets of conductive traces are brought into electrical contact, for example, via a current path through the top layer (e.g., via the bottom surface 122 of the top substrate 106), the second set 118 may be raised to a potential corresponding to the location of a touch point. In at least one embodiment, line 3 (i.e., L3) of controller 212 may be configured as a high impedance input, so as to effectively remove any affect of the resistance R_cal (i.e., calibration resistance) on the circuit. In general, a touch position may be calculated by measuring (i.e., determining) the voltage at the touch point. For example, the touch point may be calculated by measuring the voltage at an input, such as line 2 (i.e., L2), of a corresponding controller 212 and/or other electronic device. In at least one embodiment, the voltage may be measured using an Analogue to Digital converter (i.e., ADC).

In accordance with at least one other embodiment of the present invention, a calibration resistance (i.e., a known resistance such as R_cal) may be implemented as generally shown in FIG. 2 to determine a pressure (i.e., force, pressure value, force value, etc.) corresponding to the touch point (i.e., touch position). In such an embodiment, the corresponding pressure may be determined by driving one end (e.g., an end corresponding to L1) of the fixed resistor 110 high, setting another end (e.g., an end corresponding to L4) of the fixed resistor 110 to a high input impedance, electronically coupling a first end of the calibration resistance to an input (e.g., L2), and driving a second end of the calibration resistance (e.g., an end corresponding to L3) low. In such an embodiment, current will flow to ground through R_top, R_p, and R_cal. First (i.e., v1) and second (i.e., v2) voltages may be determined, for example, by measuring the voltages at L2 and L4, respectively. In general, v2−v1 corresponds to the voltage across R_p. In at least one embodiment, one or more voltages may be measured via one or more ADCs. Accordingly, the value of R_p may be determined from the known and/or measured values R_cal, v1 and v2 via the equation $R\_p=(v2-v1)(R\_cal/v1)$. In sensors utilizing FSR ink and/or the like, the measured resistance (i.e., R_p) is generally inversely proportional to an applied force. Accordingly, in one or more embodiments, 1/R_p may correspond to an applied force. It should be understood, however, that any appropriate technique may be utilized to determine a value corresponding to an applied force to meet the design criteria of a particular application. Accordingly, any appropriate technique may be utilized to add pressure sensitivity to a sensor such that the design criteria of a particular application is satisfied.

While the above embodiment has been described with reference to force and/or pressure of a corresponding touch point, it should be understood that it is not necessary to directly measure either "force" or "pressure". Instead, a quantity (i.e., value) corresponding to the force and/or pressure may be determined. In particular, a quantity corresponding to a product of touch force and touch area, and/or a product of pressure and the square of touch area, may be determined (i.e., measured, calculated, etc.). Accordingly, in the above and following discussion, "pressure" and "force" are generally used interchangeably and may be referred to generally as a "pressure value." It should also be understood that a scroll sensor in accordance with one or more embodiments of the present invention may be any appropriate shape (e.g., straight, arc, s-shape, strip shaped, etc.) to satisfy the design criteria of a particular application.

Figure 3:
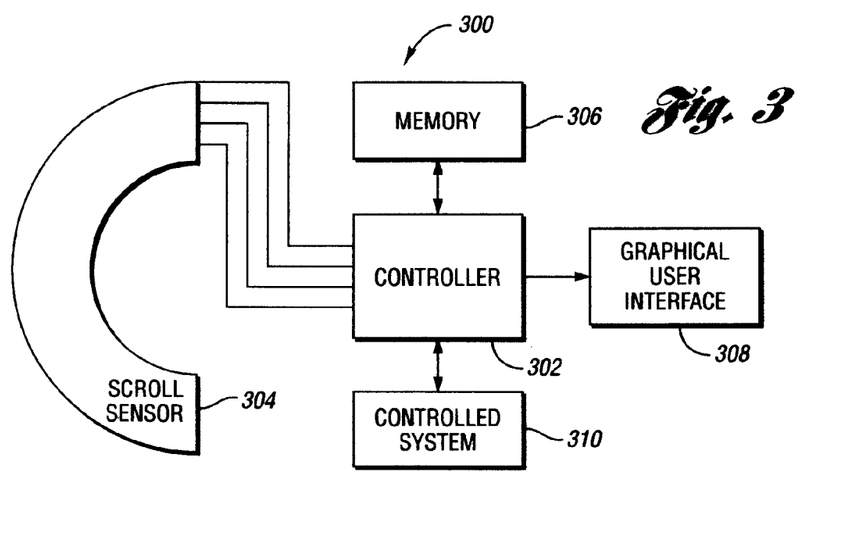
FIG. 3 is a block diagram of a system in accordance with an embodiment of the present invention.

Referring to FIG. 3, a block diagram of a system 300 in accordance with a non-limiting aspect of the present invention is shown. The system 300 may be advantageously implemented in connection with the sensor 100 described previously in connection with FIG. 1, the system 200 described previously in connection with FIG. 2, and/or any appropriate sensor and/or system to meet the design criteria of a particular application. In general, the system 300 may comprise a controller 302 (e.g., the controller 212), a sensor 304 (e.g., the sensor 100 and/or 210), a memory 306, a graphical user interface (i.e., GUI) 308, a controlled system 310, or any appropriate combination and/or subset thereof. The controller 302 may be electronically coupled to (i.e., in electronic communication with) the sensor 304, the memory 306, the GUI 308, and/or the controlled system 310 such that signals (e.g., electronic signals) may be unidirectionally and/or bi-directionally transferred between the controller 302 and one or more of the other devices (i.e., 304, 306, 308, and/or 310) of the system 300.

In at least one embodiment of the present invention, the controller 302 may be a computer, microprocessor, and/or other electronic device which executes software, executes firmware, and/or which performs other logical exercises. In general, the controller 302 may be electronically coupled (e.g., via one or more GPIO lines, etc.) to the sensor 304 for receiving one or more signal (i.e., SENSIG) from sensor 304. In at least one embodiment, the controller 302 may be configured to detect a user contact (i.e., touch) and/or determine a pressure value based at least in part on SENSIG. The controller 302 may also be configured to initiate (i.e., trigger, perform, etc.) one or more control function based at least in part on the detected user contact and/or determined pressure value.

The sensor 304 may be any appropriate sensor, such as a scroll sensor, and may have any appropriate shape (e.g., annular, round, square, triangular, etc.) to meet the design criteria of a particular application, such as the shapes described in U.S. patent application Ser. No. 11/129,805 filed May 16, 2005 (incorporated by reference in its entirety), now U.S. Pat. No. 7,310,089. The sensor 304 is generally electronically coupled to the controller 302 for generating and/or providing the one or more signal (i.e., SENSIG) to the controller 302. Furthermore, as previously discussed, the sensor 304 may be implemented such that a pressure value may be determined.

The memory 306 may be any device capable of storing instructions executable by the controller 302, and/or capable of providing long term and/or short term storage of data. Such devices may include PROM, EPROM, EEPROM, flash memory, and/or the like. In one non-limiting embodiment of the present invention, the memory 306 may be electronically coupled to the controller 302 and may store one or more control functions and/or one or more lists of elements.

The GUI 308 may be any device capable of conveying data and/or information to a user (i.e., operator), such as a video screen, a monitor, a display, an audio speaker, and/or the like. In one non-limiting embodiment of the present invention, the GUI 308 may be electronically coupled to the controller 302 for conveying one or more control functions and/or one or more lists of elements to a user.

In at least one embodiment, the GUI 308 may be integrated within a device (e.g., a cell phone, a mp3 player, etc.) having the scroll sensor 304. In at least one other embodiment, the GUI 308 may be implemented remotely from the device having the sensor 304. For example, a remote control device having the sensor 304 may be implemented in connection with a remote (i.e., non-integrated) video device (e.g., television, monitor, etc.). In general, a selectable and/or selected item may be indicated by underlining, reverse video, highlighting and/or any other appropriate technique to meet the design criteria of a particular application. In at least one embodiment, touching and/or implementing movement on the sensor 304 may modify the selectable and/or selected item.

The controlled system 310 is generally any other component (e.g., a utilization circuit) that is electronically coupled to the controller 302 and which may be controlled in response to the one or more signal (e.g., SENSIG) generated by the sensor 304.

It should be understood that any appropriate type of sensor (e.g., touchpad, scroll sensor, etc.) using any appropriate position and/or pressure sensing technology (e.g., capacitive technology, strain gauge technology, etc.) may be implemented in connection with the present invention to meet the design criteria of a particular application. Furthermore, the description of the present invention uses spatial references such as top and bottom for clarity only. A sensor may generally be used in any orientation. Further, while a sensor is generally described as operating with a touch on a top substrate (e.g., 106) pushing the top substrate onto a bottom substrate (e.g., 102), the sensor may also operate with a touch on the bottom substrate pushing the bottom substrate into contact with the top substrate 106.

Figure 4:
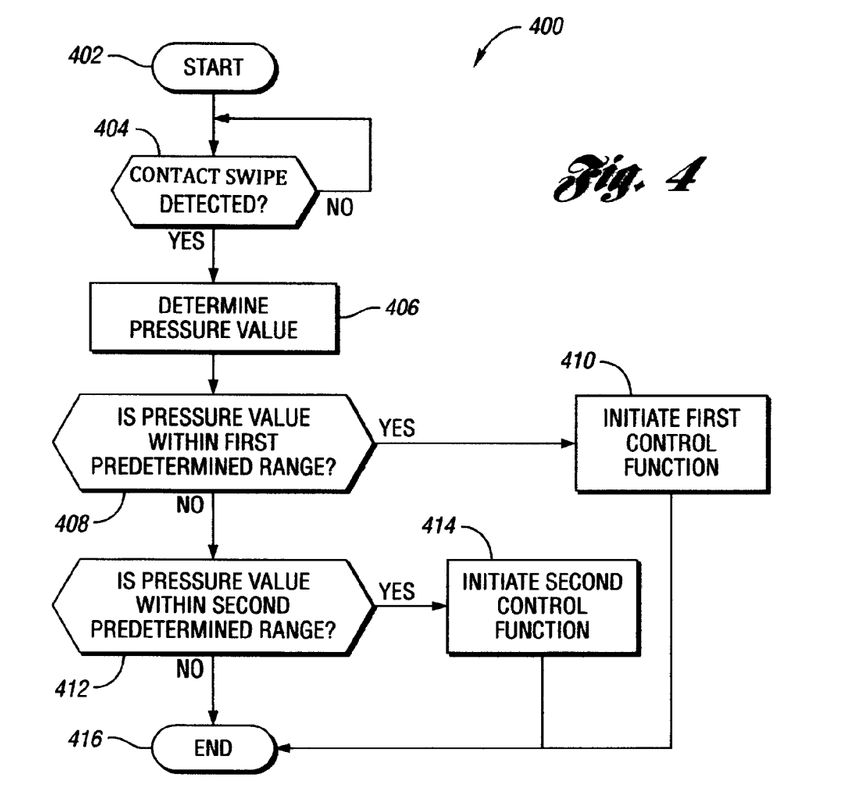
FIG. 4 is a flow diagram of a method for implementing a control function via a sensor having a touch sensitive control input surface according to an embodiment of the present invention.

Referring to FIG. 4, a flow diagram is provided of a method 400 for implementing a control function via a sensor (e.g., 100) having a touch sensitive control input surface according to an embodiment of the present invention.

The method 400 may be advantageously implemented in connection with the sensor 100 described previously in connection with FIG. 1, the system 200 described previously in connection with FIG. 2, the system 300 described previously in connection with FIG. 3, and/or any appropriate sensor and/or system to meet the design criteria of a particular application. In particular the method 400 is generally performed by a logical device, such as the controller 212 and/or 302. The method 400 generally includes a plurality of blocks or steps that may be performed serially. As will be appreciated by one of ordinary skill in the art, the order of the blocks/steps shown in FIG. 4 is exemplary and the order of one or more block/step may be modified within the spirit and scope of the present invention. Additionally, the blocks/steps of the method 400 may be performed in at least one non-serial (or non-sequential) order, and one or more blocks/steps may be omitted to meet the design criteria of a particular application. Similarly, two or more of the blocks/steps of the method 400 may be performed in parallel. Step 402 generally represents an entry point into the method 400.

At decision block 404, a contact, such as a user initiated contact, with the touch sensitive control input surface may be detected. When a contact is detected, the method 400 may proceed to step 406 (i.e., the YES leg of decision block 404). Otherwise, the method 400 generally remains at decision block 404 (i.e., the NO leg of decision block 404).

At step 406, a pressure value corresponding to the contact may be determined. From step 406, the method 400 generally initiates a control function based at least in part on the pressure value. For example, in at least one embodiment, the method 400 may proceed from step 406 to decision block 408.

At decision block 408, the pressure value may be compared to a first predetermined range. In general, the method 400 may initiate a first control function (i.e., the method 400 may proceed to step 410) when the pressure value corresponds to (i.e., falls within) the first predetermined range (i.e., the YES leg of decision block 408). Otherwise, the method 400 may proceed to decision block 412.

At decision block 412, the pressure value may be compared to a second predetermined range. In general, the method 400 may initiate a second control function (i.e., the method 400 may proceed to step 414) when the pressure value corresponds to (i.e., falls within) the second predetermined range (i.e., the YES leg of decision block 412). In at least one embodiment, the second predetermined range may correspond to all possible values not within the first predetermined range. In such an embodiment, the method 400 may perform the first control function when the pressure value corresponds to the first predetermined range and the method 400 may perform the second control function when the pressure value does not correspond to the first predetermined range. However, any appropriate ranges and any appropriate quantity of ranges may be implemented to meet the design criteria of a particular application.

The method 400 generally falls through to step 416 from step 410, decision block 412, and/or step 414. In general, step 416 represent an exit point from the method 400. However, the method 400 may be iteratively performed.

In at least one embodiment, the method 400 may further comprise the step of selecting an element (e.g., an element identified for selection, a control function, etc.) when the pressure value is greater than or equal to a predetermined entry pressure value for a predetermined duration of time and/or for a duration of time between a minimum time limit and a maximum time limit.

Furthermore, it should be understood that the method 400 may be implemented in connection with any appropriate system and/or device to meet the design criteria of a particular application. For example, the method 400 may be implemented in connection with a sensor having an input surface divided into a plurality of regions. In such an embodiment, one or more of the plurality of regions may be pressure sensitive while one or more of the plurality of regions may be insensitive to pressure. Each of the pressure insensitive regions may be assigned to a control function and each of the pressure sensitive regions may be assigned two or more control functions. In general, the method 400 may be implemented in connection with each of the pressure sensitive regions such that contact with a pressure sensitive region initiates a first control function when the pressure value is within a first predefined range and a second control function in response to the pressure value being within a second predefined range. In at least one such embodiment, each of the pressure sensitive regions may be assigned the two or more control functions based on a state of an associated controller.

One or more non-limiting embodiments will now be described. It should be understood that the non-limiting embodiments are exemplary only and that alternative embodiments may fall within the spirit and scope of the present invention.

In one exemplary embodiment, the sensor (e.g., a pressure sensitive scroll sensor, etc.) may be used (i.e., implemented, configured, etc.) to control volume. In such an embodiment, a pressure sensitive region may be assigned two or more control functions. The first control function may modify the volume at a first rate and the second control function may modify the volume at a second rate.

In another exemplary embodiment, the sensor (e.g., a pressure sensitive scroll sensor, etc.) may be used (i.e., implemented, configured, etc.) to navigate a list. In such an embodiment, a pressure sensitive region may be assigned two or more control functions. The first control function may scroll at a first rate and the second control function may scroll at a second rate.

In another exemplary embodiment, the sensor (e.g., a pressure sensitive scroll sensor, etc.) may be used (i.e., implemented, configured, etc.) to navigate a list having a plurality of elements. In such an embodiment, the elements may correspond to one or more characters in an alphabet and/or word in a language. Furthermore, a first control function associated with a pressure sensitive region may scroll through the list at a predetermined rate and a second control function associated with the pressure sensitive region may step through the list by a predefined number of elements.

In another exemplary embodiment, the sensor (e.g., a pressure sensitive scroll sensor, etc.) may be used (i.e., implemented, configured, etc.) to step through a list having a plurality of elements. In such an embodiment, the elements may correspond to one or more characters in an alphabet and/or word in a language. Furthermore, a first control function associated with a pressure sensitive region may step through the list at a first predefined number of elements and a second control function associated with the pressure sensitive region may step through the list by a second predefined number of elements.

In another exemplary embodiment, the sensor (e.g., a pressure sensitive scroll sensor, etc.) may be used (i.e., implemented, configured, etc.) to navigate a hierarchical list. In such an embodiment, a pressure sensitive region may be assigned two or more control functions. The first control function may navigate a first layer of the hierarchical list and the second control function may navigate a second layer of the hierarchical list.

In another exemplary embodiment, the sensor may be a pressure sensitive sensor, such as a pressure sensitive scroll sensor, divided into a central region and a plurality of end regions. Each of the end regions may, for example, cover the end 20% of sensor length and the central region could cover the remaining 60% of the sensor. Pressure information may be ignored within the central region such that scrolling and/or other appropriate control function may be effected within the central region by touching and then moving toward one end. Within the central region, then, the direction and amount of motion generally determines the control function such as the direction and amount of scrolling. If touch motion ceases within the central region, no further functionality (e.g., scrolling) is performed. By contrast, touching within an end region may cause a control function (e.g., scrolling) to occur with a speed, rate and/or step that is directly proportional to touch force (i.e., pressure value). Furthermore, the sensor may be configured such that a control function (e.g., direction of scroll and/or movement through a list, etc.) corresponds to the end region upon which the touch is applied.

In another exemplary embodiment, the sensor may be a pressure sensitive sensor, such as a pressure sensitive scroll sensor, and pressure information (e.g., pressure value) may be utilized from all or substantially all of a surface of the sensor. In such an embodiment, the direction of a first touch motion may determine the direction of scrolling and touch pressure (i.e., pressure value) may determine the speed (i.e., rate, velocity, step size, etc.) of the scrolling. Optionally, the touch motion may be required to persist for a predetermined distance and/or time before scrolling begins, and/or before pressure is used to determine scroll speed. Similarly, when direction of the touch motion is changed, for example by a user, motion may be required to persist for a predetermined second distance and/or second time before scrolling in the first direction ceases. Furthermore, a third distance and/or third time may be required before scrolling begins in the opposite direction and/or before pressure is again used to determine speed.

In another exemplary embodiment, the sensor may be a pressure sensitive sensor, such as a pressure sensitive scroll sensor, that is logically divided in half. In such an embodiment, a touch applied in one half may cause (i.e., trigger, initiate, etc.) scrolling in a first direction with a first speed that is proportional to pressure (i.e., pressure value). Similarly, a touch applied in the other half may cause scrolling in a second (e.g., an opposite direction, etc.) direction with a second speed that is proportional to pressure (i.e., pressure value).

In another exemplary embodiment, pressure sensitivity (i.e., pressure value, pressure, etc.) may be used only after a touch has been applied to a corresponding sensor for a period of time exceeding a predetermined touch duration (i.e., time period, etc.). Such an embodiment may allow a brief touch to perform a first function, and an extended touch (i.e., a touch exceeding the predetermined touch duration) to perform a second function. The first and/or second functions may be pressure sensitive.

In another exemplary embodiment, pressure information (i.e., pressure value) may be used to directly index into a selection of elements and/or parameter values. In such an embodiment, a light pressure may increment or decrement a selection by one element and a comparatively greater (i.e., higher) pressures could increment or decrement a selection by additional elements (e.g., a succession of single element increments or decrements, etc.) and/or more than one element. A move (i.e., increment, decrement, etc.) from one element and/or parameter value to another could be irreversible, such that a decrease in pressure generally does not result in a reversal of the move. Such a mode of operation may be referred to as "direct ratchet" mode. In general, the operation of such a mode is "direct" because pressure is proportional to element index and/or parameter value, and "ratchet" because of the move is generally irreversible. In direct ratchet mode, the selection mechanism may correspond to the cessation (i.e., removal) of touch. Alternatively the selection mechanism may correspond to operation of a separate switch. An optional variation of direct ratchet mode is "direct bi-directional" mode. In "direct bi-directional" mode, a first pressure value and/or range of pressure values may correspond to an increment of a selection (i.e., element index, parameter value, etc.) and a second pressure value and/or range of pressure values may correspond to a decrement of a selection. In such a mode, the selection mechanism may be triggered by the application of a substantially constant pressure for a predetermined dwell time and/or any other appropriate selection mechanism to meet the design criteria of a particular application.

One or more non-limiting embodiments will now be described for associating (i.e., translating) a pressure value with (i.e., into) a speed (i.e., rate of change, step size, etc.), such as a scroll speed. It should be understood that the non-limiting embodiments are exemplary only and that alternative embodiments may fall within the spirit and scope of the present invention.

In one exemplary embodiment, the speed may be varied substantially continuously (i.e., linearly) within a range in response to a substantially continuous range of pressures. Such an embodiment is generally analogous to an analogue speed to pressure relationship. However, it should be understood that the speed and pressure ranges may be considered substantially continuous in an embodiment having a digital controller, such as an 8-bit micro-controller which calculates integer values between 0 and 255 inclusively, and/or one or more digital elements. That is, such an embodiment generally includes devices wherein the resolution of the speed and pressure ranges may be less than a corresponding resolution of an analogue device. In general, the minima (e.g., minimum value) and maxima (e.g., maximum value) of the scroll speed range may be selected (i.e., set, determined, predetermined, etc.) to meet the design criteria of a particular application. For example, the minima and maxima values may be selected such that a user may scroll through a list of songs at speeds between one song per second at low forces and thousands of songs per second at high forces.

In another exemplary embodiment, a plurality of pressure ranges may be defined with each pressure range corresponding to a unique or substantially unique speed. For example, a first and second pressure range may be defined such that the first and second pressure range correspond to a first and second speed. However, any appropriate number of pressure ranges corresponding to any appropriate speeds may be defined to satisfy the design criteria of a particular application.

In general, any appropriate relationship (i.e., correspondence) between applied force (i.e., pressure value) and speed (i.e., rate of change, step size, etc.) may be implemented to meet the design criteria of a particular application. For example, the relationship may be linear, substantially linear, non-linear, substantially non-linear, or the like. Similarly, the relationship may be modified within a device in response to any appropriate stimulus (i.e., trigger) to meet the design criteria of a particular application. In general, the relationship may be embodied in any appropriate form, such as an equation, a look-up table and/or the like.

One or more benefits which may correspond to one or more embodiments of the present invention will now be described. It should be understood that the benefits are non-limiting and that additional benefits derived from one or more embodiments of the present invention may be recognized by those skilled in the art.

One benefit of pressure sensitive scrolling (i.e., movement) may be facilitated motion through large lists of discrete items (i.e., elements). For example, a digital audio player may store tens of thousands of songs along with an index of the songs. Subsets (e.g., members) of the index may be viewed on a display along with some indication of which song or songs may be selected. Scrolling a substantial portion of the index at a fixed speed may be very time consuming. However the amount of time required to traverse (i.e., scroll) the substantial portion of the index may be reduced by implementing one or more embodiments of the present invention such that speed of scrolling generally corresponds (e.g., is proportional, etc.) to pressure (i.e., a pressure value). Similarly, such a benefit may be realized via implementation of an embodiment of the present invention in connection with any appropriate device, index and/or media such as photos, videos or other media items, addresses in an address book, channels on an electronic program guide, files on a personal computer and/or the like.

One or more embodiments of the present invention may also be beneficially implemented in connection with a list (i.e., index) of letters and/or characters available for alphanumeric text entry. Text entry is generally an important function for portable electronic devices, such as an electronic address book wherein text entry provides a mechanism for adding names and numbers to the address book. In such an embodiment, one or more embodiments of the present invention may be implemented to quickly navigate among an ordered list of possible letters and/or characters. One or more embodiments of the present invention may be particularly beneficial when implemented in connection with a language having large numbers of alphabet characters.

One or more embodiments of the present invention may also be beneficially implemented in connection with hierarchical lists. For example, one or more pressure ranges may be defined. Each of the pressure ranges may be associated with (i.e., mapped to) a level in the hierarchy. Each pressure range may also be associated with a speed such that the speed (e.g., scrolling speed) is appropriate for the corresponding level of the hierarchy. Digital audio files, for example, may be organized into hierarchical layers of album and song, with the song layer being the deepest and presumably having the greater number of items. In such an exemplary embodiment, first and second pressure ranges (e.g., high and low) corresponding to first and second speeds, respectively, may be defined. The first speed may correspond to a predetermined number of albums per time unit, and the second speed may correspond to a certain number of songs per time unit. Optionally, the higher pressure may correspond with (i.e., cause, implement, etc.) scrolling through either the highest (presumed least numerous) or deepest (presumed most numerous) levels of the hierarchy, or vice-versa.

Other hierarchical lists that may benefit from pressure sensitive scrolling include but are not limited to chapters, pages, and lines in electronic documents; weeks, days, and hours in an electronic program guide; channels vs. full pages of channels in an electronic program guide; years, months, and weeks in a digital photo album; beginning letters then names in a contact list or address book; levels of computer file systems; and/or the like.

In general, non-hierarchical and hierarchical pressure sensitive scrolling techniques may also be interspersed in accordance with one or more embodiments of the present invention. Such an embodiment may be particularly beneficial when one or more levels of hierarchy contain a substantial number of list elements. For example, two or more pressure levels may be dedicated to intra-level scrolling, while other pressure levels may be dedicated for inter-level scrolling. A particular type of hierarchical list that may benefit from one or more such embodiments of the present invention is a list of words in a dictionary, thesaurus, and/or other word-list. Letters at word-beginnings may form the highest level of the hierarchy, with each letter heading containing very many words. Furthermore, multiple pressure levels may be dedicated to facilitate movement within a letter heading and one or more pressures (e.g., higher pressures, etc.) may be dedicated to moving between letter headings.

Pressure sensitive scrolling of word-lists may be especially beneficial in keyboardless electronic devices that nonetheless require text entry. Electronic dictionaries and cell phones are two examples of such devices. In at least one embodiment, the word-list may be a name-list for text entry into an address book. In such an embodiment, the name-list may be customized to include names for specific target markets since, for example, Japanese names may be substantially different from American and European names.

One or more embodiments of the present invention may also beneficially intersperse pressure sensitive scrolling information with pressure-responsive and/or non-pressure responsive functions. For example, a touch and release may be interpreted as a page-up or page-down function when scrolling through an electronic program guide. In addition, if the touch duration exceeds a predetermined duration, the continued touch may implement (i.e., trigger) pressure sensitive scrolling through channels.

One or more embodiments of the present invention may also be beneficially implemented in connection with choosing among discrete possibilities in non-list form, such as a set of control icons, web links, and/or the like. Such items are generally not linearly organized in any visual sense. However, for purposes of scrolling and/or selection, such items may be organized into a logically linear list. When such items are numerous, it may be beneficial to move between them at a speed corresponding to pressure applied to a corresponding sensor, such as a scroll sensor. Furthermore, scrolling (i.e., navigation) through the list may be made circular in the sense that the first element of the list may follow the last element of the list and vice-versa.

One or more embodiments of the present invention may also be beneficially implemented in connection with manipulation of a continuous parameter. For example, audio volume, bass, treble, balance and/or the like are substantially continuous parameters. Pressure (i.e., pressure value) may be implemented such that a value of the continuous parameter may be modified in either a substantially continuous fashion or in a discrete fashion.

One or more embodiments of the present invention may also be beneficially implemented in connection with detecting selection. For example, the first derivative of pressure with respect to time generally includes peaks corresponding to sudden increases of pressure. A selection (i.e., entry, press, etc.) may generally be identified by monitoring for (i.e., detecting) such peaks.

One or more embodiments of the present invention may also be beneficially implemented in connection with the direct ratchet mode, described previously, to select numbers to be dialed on a cell phone. In such an embodiment, direct ratchet mode is generally analogous to a rotary dial phone, wherein a disk is rotated to a selected number and then released to indicate selection. Similarly, an appropriate force may be applied to a pressure sensitive sensor (e.g., a pressure sensitive scroll sensor) until a desired number is identified. The force may then be removed to indicate entry (i.e., selection) of that number.

Similarly, one or more embodiments of the present invention may be beneficially implemented in connection with the direct bi-directional mode, described previously. In contrast to direct ratchet mode embodiments, an embodiment having a bi-directional mode may allow a user to return to a previous value by releasing an applied pressure. Such an embodiment may provide a user with the ability to select a number, value and/or item that they may have overshot. In at least one such embodiment, the selection mechanism may comprise a pause of a predetermined duration at the desired number. However, any appropriate selection mechanism may be implemented to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for implementing a control function via a sensor having a touch sensitive control input surface, the method comprising:
    detecting a contact swipe with the touch sensitive control input surface, wherein the contact swipe is a touch on the input surface which is initiated at a beginning point on the input surface and extends from the beginning point along a segment of the input surface to an ending point on the input surface while in constant contact with the input surface;
    determining a pressure value corresponding to the pressure of the contact swipe along the segment of the touch sensitive control input surface;
    initiating a first control function in response to the pressure value of the contact swipe being within a first predetermined range; and
    initiating a second control function in response to the pressure value of the contact swipe being within a second predetermined range outside of the first predetermined range.

2. The method of claim 1 wherein the sensor is configured to control volume and the first control function modifies the volume at a first rate and the second control function modifies the volume at a second rate.

3. The method of claim 1 wherein the sensor is configured to navigate a list and the first control function scrolls through the list at a first rate and the second control function scrolls through the list at a second rate.

4. The method of claim 1 wherein the sensor is configured to navigate a list having a plurality of elements and the first control function scrolls through the list at a predetermined rate and the second control function steps through the list by a predetermined number of elements.

5. The method of claim 4 wherein the plurality of elements correspond to at least one of a character in an alphabet and a word in a language.

6. The method of claim 4 further comprising selecting an element when the pressure value is greater than or equal to a predetermined entry pressure value for a predetermined duration of time.

7. The method of claim 1 wherein the sensor is configured to step through a list having a plurality of elements and the first control function steps through the list at a first predetermined number of elements and the second control function steps through the list by a second predetermined number of elements.

8. The method of claim 7 wherein the plurality of elements correspond to at least one of a character in an alphabet and a word in a language.

9. The method of claim 1 wherein the sensor is configured to navigate a hierarchical list and the first control function navigates a first layer of the hierarchical list and the second control function navigates a second layer of the hierarchical list.

10. A method for implementing a control function via a sensor having a touch sensitive control input surface, the method comprising:
    dividing the touch sensitive control input surface into a plurality of regions, wherein one or more of the plurality of regions are pressure sensitive regions;
    assigning each of the plurality of regions to at least one control function, wherein each of the pressure sensitive regions are assigned two or more control functions;
    determining when an operator initiates a contact swipe with one of the pressure sensitive regions, wherein the contact swipe is a touch on the one pressure sensitive region which is initiated at a beginning point on the one pressure sensitive region and extends from the beginning point along a segment of the one pressure sensitive region to an ending point on the one pressure sensitive region while in constant contact with the one pressure sensitive region;
    determining a pressure value corresponding to the pressure of the contact swipe along the segment of the one pressure sensitive region;
    initiating a first control function in response to the pressure value of the contact swipe being within a first predetermined range; and
    initiating a second control function in response to the pressure value of the contact swipe being within a second predetermined range outside of the first predetermined range.

11. The method of claim 10 wherein each of the pressure sensitive regions are assigned two or more control functions based on a state of a corresponding controller.

12. The method of claim 10 wherein the sensor is configured to control volume and the first control function modifies the volume at a first rate and the second control function modifies the volume at a second rate.

13. The method of claim 10 wherein the sensor is configured to navigate a list and the first control function scrolls through the list at a first rate and the second control function scrolls through the list at a second rate.

14. The method of claim 10 wherein the sensor is configured to navigate a list having a plurality of elements and the first control function scrolls through the list at a predetermined rate and the second control function steps through the list by a predetermined number of elements.

15. The method of claim 14 wherein the plurality of elements correspond to at least one of a character in an alphabet and a word in a language.

16. The method of claim 14 further comprising selecting an element when the pressure value is greater than or equal to a predetermined entry pressure value for a duration of time between a minimum time limit and a maximum time limit.

17. The method of claim 10 wherein the sensor is configured to step through a list having a plurality of elements and the first control function steps through the list by a first predetermined number of elements and the second control function steps through the list by a second predetermined number of elements.

18. The method of claim 17 wherein the plurality of elements correspond to at least one of a character in an alphabet and a word in a language.

19. The method of claim 10 wherein the sensor is configured to navigate a hierarchical list and the first control function navigates a first layer of the hierarchical list and the second control function navigates a second layer of the hierarchical list.

* * * * *